(12) United States Patent
Ezra et al.

(10) Patent No.: US 7,978,735 B2
(45) Date of Patent: Jul. 12, 2011

(54) SINGLE CHIP TUNER INTEGRATED CIRCUIT FOR USE IN A CABLE MODEM

(75) Inventors: Ronen Ezra, Kfar Saba (IL); Shaul Klein, Herzelia (IL)

(73) Assignee: Intel Corporation, Santa Clara, CA (US)

( * ) Notice: Subject to any disclaimer, the term of this patent is extended or adjusted under 35 U.S.C. 154(b) by 753 days.

(21) Appl. No.: 11/775,419

(22) Filed: Jul. 10, 2007

(65) Prior Publication Data

US 2008/0089362 A1      Apr. 17, 2008

Related U.S. Application Data

(60) Provisional application No. 60/829,813, filed on Oct. 17, 2006.

(51) Int. Cl.
*H04J 1/02* (2006.01)
(52) U.S. Cl. ........................................ 370/493; 375/222
(58) Field of Classification Search .................. 370/493, 370/485, 486, 480; 375/222
See application file for complete search history.

(56) References Cited

U.S. PATENT DOCUMENTS

| | | | |
|---|---|---|---|
| 5,737,035 A | 4/1998 | Rotzoll | |
| 5,819,157 A | 10/1998 | Ben-Efraim et al. | 725/68 |
| 5,870,439 A | 2/1999 | Ben-Efraim et al. | 375/346 |
| 5,999,793 A | 12/1999 | Ben-Efraim et al. | 725/68 |
| 6,177,964 B1 | 1/2001 | Birleson et al. | |
| 6,400,416 B1 | 6/2002 | Tomasz | 348/654 |
| 2004/0122888 A1* | 6/2004 | Carmichael | 709/200 |
| 2004/0172658 A1* | 9/2004 | Rakib et al. | 725/120 |
| 2005/0020223 A1* | 1/2005 | Ellis et al. | 455/186.1 |
| 2005/0124289 A1* | 6/2005 | Coffin, III | 455/3.02 |
| 2005/0144646 A1* | 6/2005 | Lecrom et al. | 725/100 |
| 2007/0216482 A1* | 9/2007 | Hollenbeck et al. | 330/254 |
| 2007/0218850 A1* | 9/2007 | Pan | 455/189.1 |
| 2008/0066103 A1* | 3/2008 | Ellis et al. | 725/38 |
| 2008/0076372 A1* | 3/2008 | Nutt | 455/214 |
| 2009/0052582 A1* | 2/2009 | Oren | 375/319 |

* cited by examiner

*Primary Examiner* — Brian D Nguyen
(74) *Attorney, Agent, or Firm* — Grossman, Tucker, Perreault & Pfleger PLLC (57) ABSTRACT

A novel single chip tuner integrated circuit (IC) for multiple video reception in a cable modem. The tuner circuit is well suited for use in cable modem systems adapted to implement the DOCSIS 3.0 specification which specifies multiple simultaneous video channel reception. The single-chip tuner integrated circuit comprises a plurality of tuner sub-circuits wherein each tuner sub-circuit is operative to generate a single output channel, determined in accordance with a tune commend input. The tune command input is used to generate a frequency reference signal that is input to a corresponding tuner sub-circuit. The frequency reference signal for a tuner sub-circuit is mixed with an input RF receive signal from the CATV input to the cable modem to generate a baseband channel. The baseband channel is subsequently filtered, amplified and input to the PHY circuit wherein undergoes analog to digital conversion (ADC) before being input to a baseband processor.

32 Claims, 5 Drawing Sheets

SINGLE CHIP TUNER INTEGRATED CIRCUIT FOR USE IN A CABLE MODEM

REFERENCE TO PRIORITY APPLICATION

This application claims priority to U.S. Provisional Application Ser. No. 60/829,813, filed Oct. 17, 2006, entitled "Low Cost, High Performance CMOS Tuner for Multi Video Reception and DOCSIS3.0 CM", incorporated herein by reference in its entirety.

FIELD OF THE INVENTION

The present invention relates to the field of data communications and more particularly relates to a single chip tuner integrated circuit (IC) for multiple video reception in a Data Over Cable Service Interface Specification (DOCSIS) compliant cable modem.

BACKGROUND OF THE INVENTION

Currently there are more than 50 million high-speed Internet access customers in North America. Recently, the cable modem has become the broadband connection of choice for many Internet users, being preferred over the nearest rival broadband technology, Digital Subscriber Line (DSL), by a significant margin.

Cable modems are well known in the art. A cable modem is a type of modem that provides access to a data signal sent over the cable television (CATV) infrastructure. Cable modems are primarily used to deliver broadband Internet access, taking advantage of unused bandwidth on a cable television network. In 2005 there were over 22.5 million cable modem users in the United States alone.

A cable modem is a network appliance that enables high speed data connections to the internet via data services provided by the local cable company. Data from the home is sent upstream on a carrier that operates on the 5 MHz to 42 MHz band of the cable spectrum. Downstream data is carried on a 88 MHz to 860 MHz band. The cable modem system can have additional networking features such as Voice over IP (VoIP), wireless connectivity or network switch or hub functionality.

The term cable Internet access refers to the delivery of Internet service over the cable television infrastructure. The proliferation of cable modems, along with DSL technology, has enabled broadband Internet access in many countries. The bandwidth of cable modem service typically ranges from 3 Mbps up to 40 Mbps or more. The upstream bandwidth on residential cable modem service usually ranges from 384 kbps to 30 Mbps or more. In comparison, DSL tends to offer less speed and more variance between service packages and prices. Service quality is also far more dependent on the client's location in relation to the telephone company's nearest central office or Remote Terminal.

Users in a neighborhood share the available bandwidth provided by a single coaxial cable line. Therefore, connection speed varies depending on how many people are using the service at the same time. In most areas this has been eliminated due to redundancy and fiber networks.

With the advent of Voice over IP telephony, cable modems are also being used to provide telephone service. Many people who have cable modems have opted to eliminate their Plain Old Telephone Service (POTS). An alternative to cable modems is the Embedded Multimedia Terminal Adapter (EMTA). An EMTA allows multiple service operators (MSOs) to offer both High Speed Internet and VoIP through a single piece of customer premise equipment. A multiple system operator is an operator of multiple cable television systems.

Many cable companies have launched Voice over Internet Protocol (VoIP) phone service, or digital phone service, providing consumers a true alternative to standard telephone service. Digital phone service takes the analog audio signals and converts them to digital data that can be transmitted over the fiber optic network of the cable company. Cable digital phone service is currently available to the majority of U.S. homes with a large number of homes are now subscribing. The number of homes subscribing is currently growing by hundreds of thousands each quarter. One significant benefit of digital phone service is the substantial consumer savings, with one recent study saying residential cable telephone consumers could save an average of $135 or more each year.

The Data Over Cable Service Interface Specification (DOCSIS) compliant cable modems have been fueling the transition of cable television operators from a traditional core business of entertainment programming to a position as full-service providers of video, voice, and data telecommunications services.

Cable systems transmit digital data signals over radio frequency (RF) carrier signals. To provide two-way communication, one carrier signal carries data in the downstream direction from the cable network to the customer and another carrier signal carries data in the upstream direction from the customer to the cable network. Cable modems are devices located at the subscriber premises that functions to convert digital information into a modulated RF signal in the upstream direction, and to convert the RF signals to digital information in the downstream direction. A cable modem termination system (CMTS) performs the opposite operation for multiple subscribers at the cable operator's head-end.

Typically, several hundreds of users share a 6 MHz downstream channel and one or more upstream channels. The downstream channel occupies the space of a single television transmission channel in the cable operator's channel lineup. It is compatible with digital set top MPEG transport stream modulation (64 or 256 QAM), and provides up to 40 Mbps. A media access control (MAC) layer coordinates shared access to the upstream bandwidth.

The latest DOCSIS specification, DOCSIS 3.0, include a number of enhancements. In order to provide faster data rates to customers, DOCSIS 3.0 introduces the concept of bonding several physical downstream channels into one virtual high speed pipe. Channel bonding is a load-sharing technique for logically combining multiple DOCSIS channels. DOCSIS 3.0 defines channel bonding for both the upstream and downstream directions. For downstream channel bonding, each downstream DOCSIS channel carries a payload of approximately 38 Mbps (50 Mbps with EuroDOCSIS). Load sharing traffic across multiple channels allows a maximum throughput of up to n×38 Mbps (or n×50 Mbps), with n representing the number of channels being bonded. A separate 6 MHz or 8 MHz frequency is used for each of the bonded channels. Upstream channel bonding is possible for a minimum of four channels, 10 to 30 Mbps each, for a total of 40 to 120 Mbps of shared throughput.

Cable modems and DOCSIS standard have made delivery of digital services over hybrid fiber coaxial (HFC) cable television systems possible. Digital data delivery of Internet data, video on demand movies, telephony, telephony over the Internet, interactive games, upstream delivery of security camera digital photos to security services and a host of other applications is now possible. These services and applications are useful and valuable with some requiring more bandwidth than others. Video and movies, for example, even when compressed using MPEG standards, require large amounts of bandwidth.

The DOCSIS 3.0 specification also enables enhanced video applications that are much improved over earlier versions of the specification. The new video applications enable simultaneous multiple video channel reception. These new video applications, however, require channel flexibility, especially in connection with the tuner circuit in the receiver portion of the cable modem. Depending on the particular video application and user settings, channels may be located anywhere in the downstream (DS) frequency band, thus requiring full band capture. Thus, the capture bandwidth (CBW) may be located anywhere in the downstream frequency band at any instant in time wherein the capture bandwidth can range from 60 to 100 MHz. The tuner must be able to receive these multiple video channels in order to meet the requirements of the specification. Moreover, practical HFC plants constraints will force MSOs to locate new video services outside the current DOCSIS3.0 CBW limitations.

It is thus desirable to have a tuning mechanism that is capable of providing multiple video channel reception that meets the requirements of the DOCSIS 3.0 cable modem specification while also providing an unlimited CBW. In addition, the tuning mechanism should operate efficiently, exhibit high performance, consume minimal board and chip area and be able to be manufactured at low cost.

SUMMARY OF THE INVENTION

The present invention is a novel single chip tuner integrated circuit (IC) for multiple video reception in a cable modem. The tuner circuit is particularly suitable for use in cable modem systems adapted to implement the DOCSIS 3.0 specification which specifies multiple simultaneous video channel reception.

The invention integrates a plurality of tuners (four in the example embodiment provided herein) tuners in a single integrated circuit chip, thus simplifying the design and reducing the overall cost of the result IC. Many wired and wireless standards today call for the use of multiple channels in parallel that enable data communication throughput increases for the same media. The DOCSIS 3.0 specification is only one example of such standards that call for the parallelizing of four channels. The multiple tuner of the invention meets the high performance of a single tuner but at a lower cost and complexity.

Integration of four tuners (for example) in a single die/package provides for (1) a reduction in the number of packages from four to one, thus reducing chip packaging costs; (2) a simplification in PCB design, thus reducing design costs, manufacturing costs and maintenance costs; (3) a reduction in PCB area, thus reducing PCB cost and providing a small applications advantage enabling area/space sensitive applications; and (4) savings in common chip modules, thus reducing die area and cost.

In operation, the single-chip tuner integrated circuit comprises a plurality of tuner sub-circuits wherein each tuner sub-circuit is operative to generate one output channel. The channel output by a tuner sub-circuit is determined in accordance with a tune command input. The tune command input is used to generate a frequency reference signal that is input to a corresponding tuner sub-circuit. The frequency reference signal for a tuner sub-circuit is mixed with an input RF receive signal from the CATV input to the cable modem to generate a baseband channel. The baseband channel is subsequently filtered, amplified and input to the PHY circuit wherein undergoes analog to digital conversion (ADC) before being input to a baseband processor.

To aid in understanding the principles of the present invention, the description is provided in the context of a DOCSIS 3.0 capable cable system comprising a cable modem adapted to receive an DOCSIS compatible RF signal feed from a cable head-end (i.e. CMTS) and to distribute video, Internet and telephony to a subscriber premises. It is appreciated, however, that the invention is not limited to use with any particular communication device or standard and may be used in optical, wired and wireless applications. Further, the invention is not limited to use with a specific technology but is applicable to any situation which cab benefit from a multi-tuner integrated circuit chip.

Several advantages of the tuner circuit of the present invention include (1) single-chip integrated circuit comprising a plurality of tuner sub-circuits achieves high performance while minimizing chip real estate; (2) lower circuit die area of the multiple tuner chip minimizes IC manufacturing costs; and (3) direct conversion design of the tuner sub-circuits is efficient and meets channel flexibility of the DOCSIS 3.0 specification.

Note that many aspects of the invention described herein may be constructed as software objects that are executed in embedded devices as firmware, software objects that are executed as part of a software application on either an embedded or non-embedded computer system running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the present invention, a single chip tuner integrated circuit for use in a cable modem comprising a frequency reference input, means for generating a plurality of channel reference signals from the frequency reference input wherein each channel reference signal is generated in accordance with a tune command signal, a radio frequency (RF) receive signal input, an amplifier coupled to the RF receive signal input, the amplifier operative to amplify the input RF receive signal to generate an amplified RF receive signal thereby, a band pass filter operative to filter the amplified RF receive signal to yield a filtered RF receive signal therefrom and a plurality of tuner circuits operative to receive the filtered RF receive signal, each tuner circuit operative to output one of a plurality of channels in accordance with a corresponding channel reference signal input thereto.

There is also provided in accordance with the present invention, a single chip tuner integrated circuit for use in a cable modem comprising a frequency reference input, means for generating a plurality of channel reference signals from the frequency reference input wherein each channel reference signal is generated in accordance with a tune command signal, a radio frequency (RF) receive signal input, an amplifier coupled to the RF receive signal input, the amplifier operative to amplify the RF receive signal to generate an amplified RF receive signal thereby and a plurality of tuner circuits operative to receive the amplified RF receive signal, each tuner circuit operative to output one of a plurality of channels in accordance with a corresponding channel reference signal input thereto.

There is further provided in accordance with the present invention, a single chip tuner integrated circuit for use in a Data Over Cable Service Interface Specification (DOCSIS) compatible cable modem comprising a frequency reference input, means for generating four channel reference signals from the frequency reference input wherein each channel reference signal is generated in accordance with a tune command signal, a radio frequency (RF) receive signal input adapted to receive a DOCSIS RF input signal and an amplifier coupled to the RF receive signal input, the amplifier operative to amplify the input RF signal to generate an amplified RF receive signal thereby and a tuner circuit comprising four tuner sub-circuits, each tuner sub-circuit operative to receive the DOCSIS RF receive signal and to output one of a plurality of channels in accordance with a corresponding channel reference signal input thereto.

There is also provided in accordance with the present invention, a cable modem comprising a memory, one or more interface ports, a single chip tuner integrated circuit, the tuner comprising a frequency reference input, means for generating a plurality of channel reference signals from the frequency reference input wherein each channel reference signal is generated in accordance with a tune command signal, a CATV radio frequency (RF) receive signal input, a plurality of tuner circuits operative to receive the RF receive signal, each tuner circuit operative to output one of a plurality of channels in accordance with a corresponding channel reference signal input thereto, a PHY circuit coupled to the tuner and operative to generate a plurality of raw video streams in accordance with the plurality of channels output from the tuner and a processor coupled to the memory, the one or more interface ports, the tuner and the PHY circuit, the processor operative to implement a media access control (MAC) layer operative to generate one or more output video streams from the plurality of raw video streams input thereto.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
|---|---|
| AC | Alternating Current |
| ADC | Analog to Digital Converter |

-continued

| Term | Definition |
|---|---|
| ASIC | Application Specific Integrated Circuit |
| BPF | Bandpass filter |
| CATV | Community Antenna Television or Cable TV |
| CBW | Capture Bandwidth |
| CM | Cable Modem |
| CMOS | Complementary Metal Oxide Semiconductor |
| CMTS | Cable Modem Termination System |
| CO | Central Office |
| CPU | Central Processing Unit |
| DAC | Digital to Analog Converter |
| DC | Direct Current |
| DCAS | Downloadable Conditional Access Systems |
| DCXO | Digitally Controlled Crystal Oscillator |
| DECT | Digital Enhanced Cordless Telecommunications |
| DHCP | Dynamic Host Control Protocol |
| DOCSIS | Data Over Cable Service Interface Specification |
| DS | Downstream |
| DSL | Digital Subscriber Line |
| DSP | Digital Signal Processor |
| DVR | Digital Video Recorder |
| EEROM | Electrically Erasable Read Only Memory |
| EMTA | Embedded Multimedia Terminal Adapter |
| FPGA | Field Programmable Gate Array |
| GPIO | General Purpose I/O |
| HDL | Hardware Description Language |
| I/F | Interface |
| I/O | Input/Output |
| I²C | Inter-Integrated Circuit bus |
| IC | Integrated Circuit |
| IP | Internet Protocol |
| LAN | Local Area Network |
| LED | Light Emitting Diode |
| LNA | Low Noise Amplifier |
| LPF | Low Pass Filter |
| MAC | Media Access Control |
| MPEG | Moving Picture Experts Group |
| MSO | Multiple Service Operator |
| NB | Narrowband |
| PC | Personal Computer |
| PCB | Printed Circuit Board |
| PDA | Personal Digital Assistant |
| PGA | Programmable Gain Amplifier |
| PLL | Phase Locked Loop |
| POTS | Plain Old Telephone Service |
| PSTN | Public Switched Telephone Network |
| QAM | Quadrature Amplitude Modulation |
| QoS | Quality of Service |
| RAM | Random Access Memory |
| RF | Radio Frequency |
| ROM | Read Only Memory |
| SLIC | Subscriber Line Interface Card |
| SONET | Synchronous Optical Network |
| TB | Tuning Band |
| US | Upstream |
| USB | Universal Serial Bus |
| VCO | Voltage Controlled Oscillator |
| VGA | Variable Gain Amplifier |
| VoIP | Voice over IP |
| WAN | Wide Area Network |
| WB | Wideband |
| WLAN | Wireless Local Area Network |
| XO | Crystal Oscillator |

Detailed Description of the Invention

The present invention is a novel single chip tuner integrated circuit (IC) for multiple video reception in a cable modem. The tuner circuit is particularly suitable for use in cable modem systems adapted to implement the DOCSIS 3.0 specification which specifies multiple simultaneous video channel reception.

To aid in understanding the principles of the present invention, the description is provided in the context of a DOCSIS 3.0 capable cable system comprising a cable modem adapted to receive an DOCSIS compatible RF signal feed from a cable head-end (i.e. CMTS) and to distribute video, Internet and telephony to a subscriber premises. It is appreciated, however, that the invention is not limited to use with any particular communication device or standard and may be used in optical, wired and wireless applications. Further, the invention is not limited to use with a specific technology but is applicable to any situation which cab benefit from a multi-tuner integrated circuit chip.

To aid in understanding the invention, the tuner mechanism is described in the context of a quad tuner (tuner circuit incorporating four individual tuner sub-circuits). It is not intended, however, that the invention be limited to this example tuner circuit, as one skilled in the art can modify the tuner shown herein to incorporate any number of tuner sub-circuits without departing from the scope of the invention.

Note that throughout this document, the term communications device is defined as any apparatus or mechanism adapted to transmit, or transmit and receive data through a medium. The communications device may be adapted to communicate over any suitable medium such as RF, wireless, infrared, optical, wired, microwave, etc. In the case of wireless communications, the communications device may comprise an RF transmitter, RF receiver, RF transceiver or any combination thereof.

The term cable modem is defined as a modem that provides access to a data signal sent over the cable television infrastructure. The term voice cable modem is defined as a cable modem that incorporates VoIP capabilities to provide telephone services to subscribers. Channel bonding is defined as a load-sharing technique for logically combining multiple DOCSIS channels into a single virtual pipe. It is described in detail in the DOCSIS 3.0 specification, incorporated herein by reference in its entirety.

Cable System Incorporating Multiple Tuner Circuit

Figure 1:
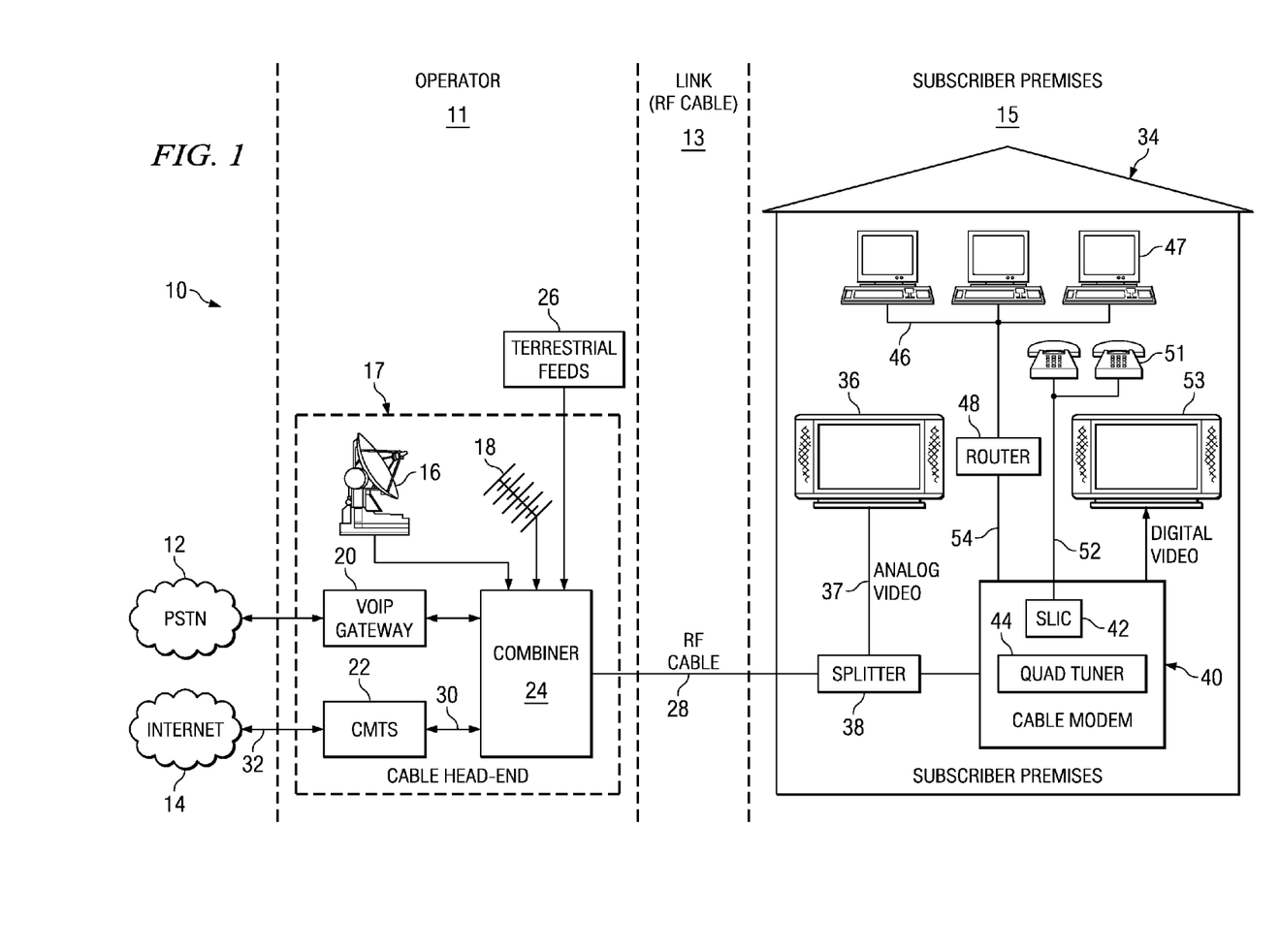
FIG. 1 is a block diagram illustrating an example cable modem system incorporating the tuner of the present invention for multiple video reception.

A block diagram illustrating a cable modem system incorporating the multiple tuner circuit of the present invention is shown in FIG. 1. The system, generally referenced 10, comprises an operator portion 11 connected to the public switched telephone network (PSTN) 12 and the Internet 14 or other wide area network (WAN), a link portion 13 comprising the RF cable 28 and a subscriber portion 15 comprising the subscriber premises 34.

The operator portion 11 comprises the cable head-end 17 which is adapted to receive a number of content feeds such as satellite 16, local antenna 18 and terrestrial feeds 26, all of which are input to the combiner 24. The cable head-end also comprises the voice over IP (VoIP) gateway 20 and Cable Modem Termination System (CMTS) 22. The combiner merges the TV programming feeds with the RF data from the CMTS.

The Cable Modem Termination System (CMTS) is a computerized device that enables cable modems to send and receive packets over the Internet. The IP packets are typically sent over Layer 2 and may comprise, for example, Ethernet or SONET frames or ATM cell. It inserts IP packets from the Internet into MPEG frames and transmits them to the cable modems in subscriber premises via an RF signal. It does the reverse process coming from the cable modems. A DOCSIS-compliant CMTS enables customer PCs to dynamically obtain IP addresses by acting as a proxy and forwarding DHCP requests to DHCP servers. A CMTS may provide filtering to protect against theft of service and denial of service attacks or against hackers trying to break into the cable operator's system. It may also provide traffic shaping to guarantee a specified quality of service (QoS) to selected customers. A CMTS may also provide bridging or routing capabilities.

The subscriber premises 34 comprises a splitter 38, cable appliances 36 such as televisions, DVRs, etc., cable modem 40, router 48, PCs or other networked computing devices 47 and telephone devices 51. Cable service is provided by the local cable provider wherein the cable signal originates at the cable head end facility 17 and is transmitted over RF cable 28 to the subscriber premises 34 where it enters splitter 38. One output of the splitter goes to the televisions, set top boxes, and other cable appliances via internal cable wiring 37.

The other output of the splitter comprises the data portion of the signal which is input to the cable modem 40. The cable modem is adapted to provide both Ethernet and USB ports. Typically, a router 48 is connected to the Ethernet port via Ethernet cable 54. One or more network capable computing devices 47, e.g., laptops, PDAs, desktops, etc. are connected to the router 48 via internal Ethernet network wiring 46. In addition, the router may comprise or be connected to a wireless access point that provides a wireless network (e.g., 802.11b/g/a) throughout the subscriber premises.

The cable modem also comprises a subscriber line interface card (SLIC) 42 which provides the call signaling and functions of a conventional local loop to the plurality of installed telephone devices 51 via internal 2-wire telephone wiring 52. In particular, it generates call progress tones including dial tone, ring tone, busy signals, etc. that are normally provided by the local loop from the CO. Since the telephone deices 51 are not connected to the CO, the SLIC in the cable modem must provide these signals in order that the telephone devices operate correctly.

The cable modem also comprises the multiple tuner 44 of the present invention. A digital video output signal is displayed to the user (i.e. cable subscribers) via televison set 53 (i.e. video display device or other cable appliance). The tuner enables the reception of multiple video channels simultaneously, as described in more detail infra.

Multiple Video Channel Cable Modem

Figure 2:
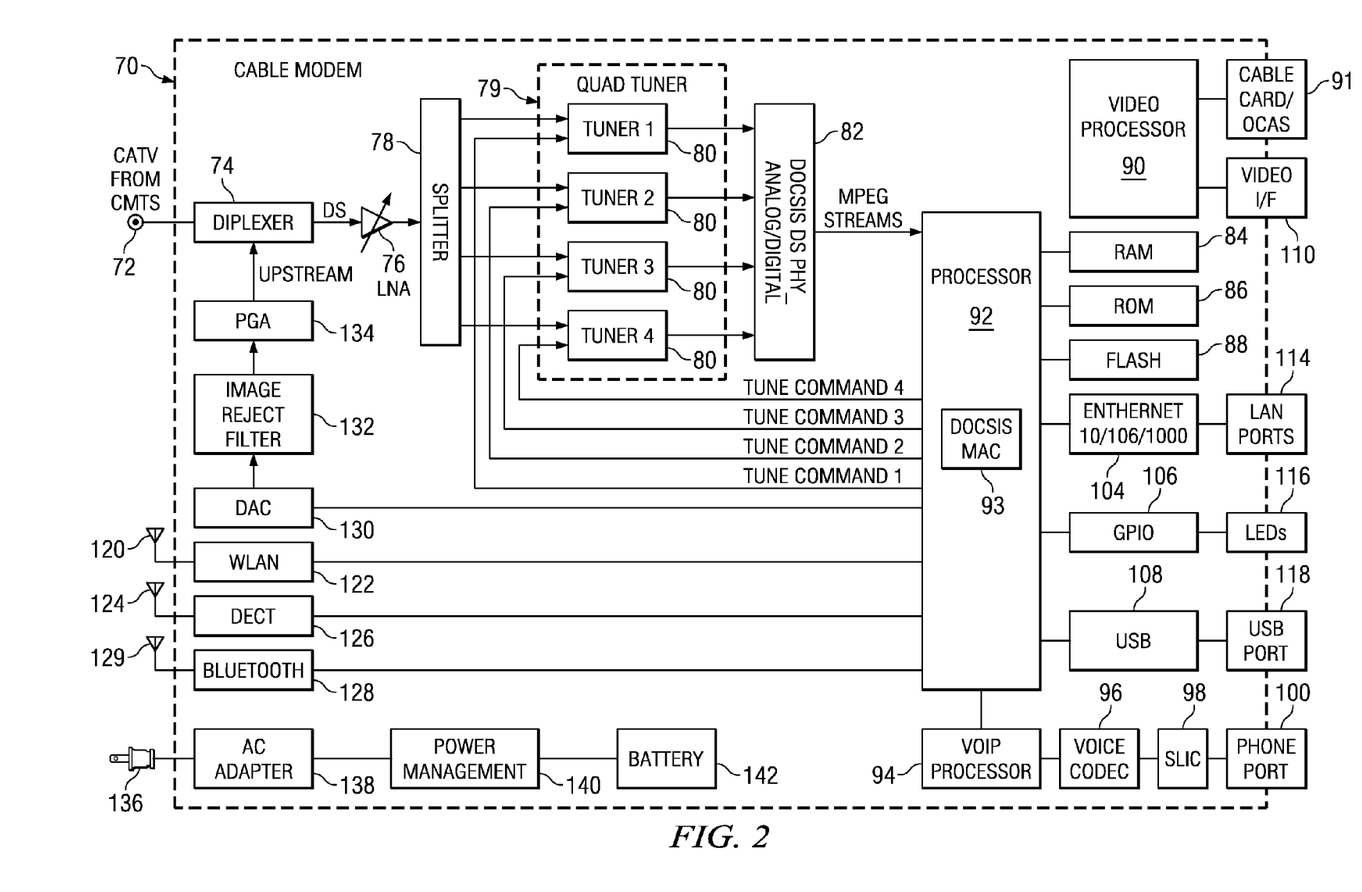
FIG. 2 is a block diagram illustrating an example cable modem incorporating the multiple tuner circuit of the present invention for multiple video reception.

A block diagram illustrating an example cable modem incorporating the multiple tuner circuit of the present invention for multiple video reception is shown in FIG. 2. The cable modem, generally referenced 70, comprises a duplexer 74, low noise amplifier (LNA) 76, splitter 78, multiple tuner circuit 79, DOCSIS PHY circuit 82, DOCSIS compatible processor 92, DOCSIS MAC 93, VoIP processor 94, voice codec 96, subscriber line interface card (SLIC) 98, phone port 100, wireless local area network (WLAN) 122 and associated antenna 120, DECT 126 and associated antenna 124, Bluetooth 128 and associated antenna 129, Ethernet interface 104, Ethernet LAN port 114, general purpose (I/O) (GPIO) interface 106, LEDs 116, universal serial bus (USB) interface 108, USB port 118, cable card/Downloadable Conditional Access Systems (DCAS) 91, video interface (I/F) 110, video processor 90, DAC 130, image reject filter 132, programmable gain amplifier (PGA) 134, AC adapter 138 coupled to mains utility power via plug 136, power management circuit 140, battery 142, RAM, 84, ROM 86 and FLASH memory 88.

Note that in the example embodiment presented herein, the cable modem and DOCSIS enabled processor are adapted to implement the DOCSIS 3.0 standard which provides for multiple channel video reception. In addition, the multiple tuner circuit 79 is presented as a quad tuner comprising four tuner sub-circuits 80 for illustration purposes only. Tuner circuits having any number of tuner sub-circuits may be constructed using the principles of the present invention.

In operation, the cable modem processor is the core chip set which in the example presented herein comprises a central single integrated circuit (IC) with peripheral functions added. The voice over IP (VoIP) processor 94 implements a mechanism to provide phone service outside the standard telco channel. Chipset DSPs and codecs 96 add the functionality of POTS service for low rate voice data.

The cable modem also comprises a subscriber line interface card (SLIC) 98 which functions to provide the signals and functions of a conventional local loop to a plurality of telephone devices connected via the phone port 100 using internal 2-wire telephone wiring. In particular, it generates call progress tones including dial tone, ring tone, busy signals, etc. that are normally provided by the local loop from the CO. Since the telephone deices are not connected to the CO, the SLIC in the cable modem must provide these signals in order that the telephone devices operate correctly.

In a traditional analog telephone system, each telephone or other communication device (i.e. subscriber unit) is typically interconnected by a pair of wires (commonly referred to as tip and ring or together as subscriber lines, subscriber loop or phone lines) through equipment to a switch at a local telephone company office (central office or CO). At the CO, the tip and ring lines are interconnected to a SLIC which provides required functionality to the subscriber unit. The switches at the central offices are interconnected to provide a network of switches thereby providing communications between a local subscriber and a remote subscriber.

The SLIC is an essential part of the network interface provided to individual analog subscriber units. The functions provided by the SLIC include providing talk battery (between 5 VDC for on-hook and 48 VDC for off-hook), ring voltage (between 70-90 VAC at a frequency of 17-20 Hz), ring trip, off-hook detection, and call progress signals such as ringback, busy, and dial tone.

A SLIC passes call progress tones such as dial tone, busy tone, and ringback tone to the subscriber unit. For the convenience of the subscriber who is initiating the call, these tones normally provided by the central office give an indication of call status. When the calling subscriber lifts the handset or when the subscriber unit otherwise generates an off hook condition, the central office generates a dial tone and supplies it to the calling subscriber unit to indicate the availability of phone service. After the calling subscriber has dialed a phone number of the remote (i.e. answering) subscriber unit, the SLIC passes a ring back sound directed to the calling subscriber to indicate that the network is taking action to signal the remote subscriber, i.e. that the remote subscriber is being rung. Alternatively, if the network determines that the remote subscriber unit is engaged in another call (or is already off-hook), the network generates a busy tone directed to the calling subscriber unit.

The SLIC also acts to identify the status to, or interpret signals generated by, the analog subscriber unit. For example, the SLIC provides −48 volts on the ring line, and 0 volts on the tip line, to the subscriber unit. The analog subscriber unit provides an open circuit when in the on-hook state. In a loop start circuit, the analog subscriber unit goes off-hook by closing, or looping the tip and ring to form a complete electrical circuit. This off-hook condition is detected by the SLIC (whereupon a dial tone is provided to the subscriber). Most residential circuits are configured as loop start circuits.

Connectivity is provided by a standard 10/100/1000 Mbps Ethernet interface 104 and Ethernet LAN port 114, USB interface 108 and USB port 118 or with additional chip sets, such as wireless 802.11a/b/g via WLAN interface 122 coupled to antenna 120. In addition, a GPIO interface 106 provides an interface for LEDs 116, etc. The network connectivity functions may also include a router or Ethernet switch core. Note that the DOCSIS MAC 93 and PHY 82 may be integrated into the cable modem processor 92 or may be separate as shown in FIG. 2 wherein the DOCSIS PHY circuit 82 is shown separate from the processor 92.

In the example embodiment presented herein, the quad tuner 79 is coupled to the CATV signal from the CMTS via port 72 and is operative to convert the RF signal received over the RF cable to an IF frequency in accordance with the four tune command signals received from the processor.

The cable modem 70 comprises a processor 92 which may comprise a digital signal processor (DSP), central processing unit (CPU), microcontroller, microprocessor, microcomputer, ASIC, FPGA core or any other suitable processing means. The cable modem also comprises static read only memory (ROM) 86, dynamic main memory 84 and FLASH memory 88 all in communication with the processor via a bus (not shown).

The magnetic or semiconductor based storage device 84 (i.e. RAM) is used for storing application programs and data. The cable modem comprises computer readable storage medium that may include any suitable memory means, including but not limited to, magnetic storage, optical storage, semiconductor volatile or non-volatile memory, biological memory devices, or any other memory storage device.

Any software required to implement the single chip tuner integrated circuit of the present invention is adapted to reside on a computer readable medium, such as a magnetic disk within a disk drive unit. Alternatively, the computer readable medium may comprise a floppy disk, removable hard disk, Flash memory, EEROM based memory, bubble memory storage, ROM storage, distribution media, intermediate storage media, execution memory of a computer, and any other medium or device capable of storing for later reading by a computer a computer program implementing the system and methods of this invention. The software adapted to implement the single chip tuner integrated circuit of the present invention may also reside, in whole or in part, in the static or dynamic main memories or in firmware within the processor of the computer system (i.e. within microcontroller, microprocessor or microcomputer internal memory).

Figure 3:
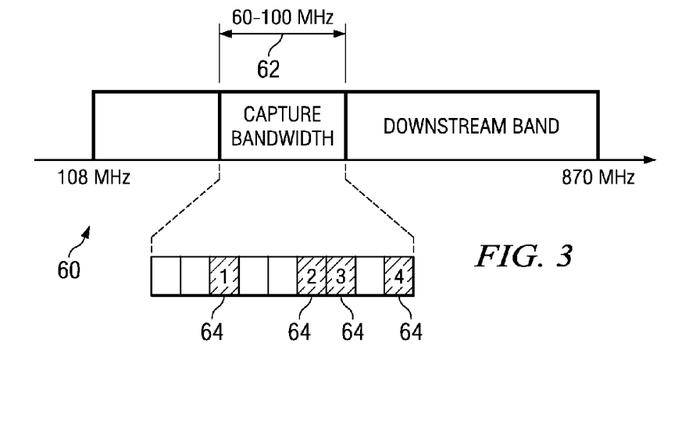
FIG. 3 is a diagram illustrating the capture bandwidth of the downstream band received from the CMTS.

A diagram illustrating the capture bandwidth (CBW) of the downstream band received from the CMTS is shown in FIG. 3. In accordance with the DOCSIS 3.0 specification, used here for illustration purposes only, the downstream (DS) frequency band range, generally referenced 60, extends from 108 MHz to 870 MHz. The capture bandwidth 62 (defined as the sum of the tuning bands in the tuning band (TB) list) is between 60 and 100 MHz in width and may lie anywhere in the DS band. The TB is defines a single continuous frequency interval, in MHz, located anywhere in the downstream band (108 MHz to 870 MHz). The tuning band list (TB List) is defined as a list of one or more Tuning Bands supported by the cable modem that defines the cable modem tuning capabilities.

Within the capture bandwidth, are four DS channels 64 that can be located anywhere in the capture bandwidth. An example arrangement of the four DS channels is shown in FIG. 3 where the four DS channels are indicated by the crosshatched channels 64.

Figure 4:
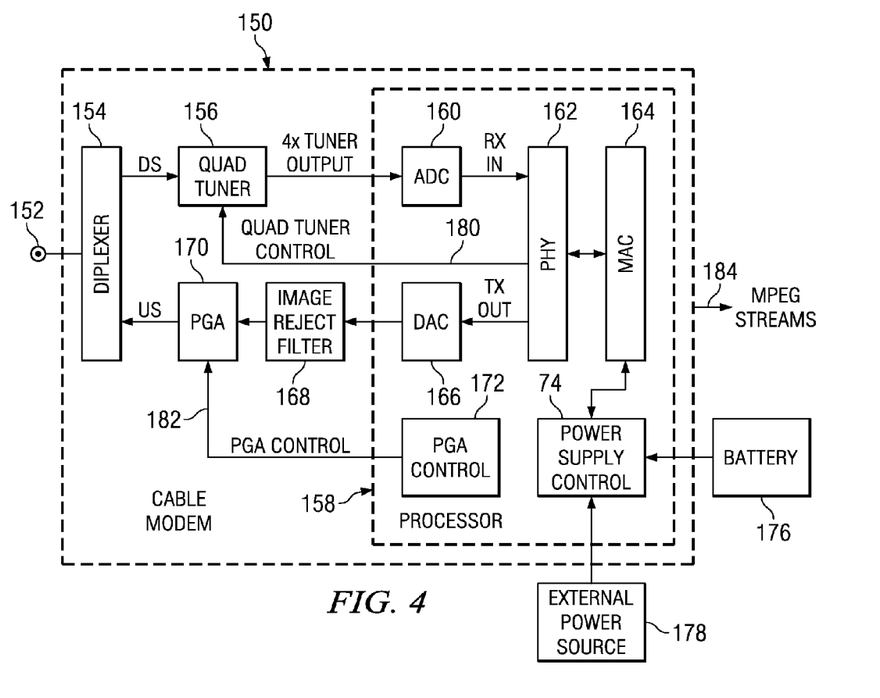
FIG. 4 is a simplified block diagram illustrating the processor of the cable modem of FIG. 3 and its connection to the quad tuner of the present invention in more detail.

A simplified block diagram illustrating the processor of the cable modem of FIG. 3 and its connection to the quad tuner of the present invention in more detail is shown in FIG. 4. The example cable modem, generally referenced 150, comprises diplexer coupled to a CATV input 152, quad tuner circuit 154, processor 158, image reject filter 168 and PGA 170. The processor 158 comprises an analog to digital converter (ADC) 160, PHY circuit 162, digital to analog converter (DAC) 166, PGA control circuit 172, power supply control 74 and MAC 164. Power is supplied by an external power source 178 e.g., utility power, etc. or a battery 176.

In operation, in the downstream (i.e. receive) direction, the receive signal from the diplexer is input to the quad tuner circuit 156. The four tuner output signals are input to the eight ADCs to provide four RX I and Q input signals to the PHY circuit. The PHY circuit provides a quad tuner control signal 180 that controls the tuning of the four tuner sub-circuits within the quad tuner. After MAC processing, one or more MPEG video streams 184 are output of the cable modem.

In the upstream (US) (i.e. transmit) direction, a digital TX output signal provided by the PHY circuit is converted to analog by the DAC. The analog signal is then filtered via the image reject filter before being amplified by the PGA whose gain is controlled by a PGA control signal 182 generated by the PGA control circuit 172.

Figure 5:
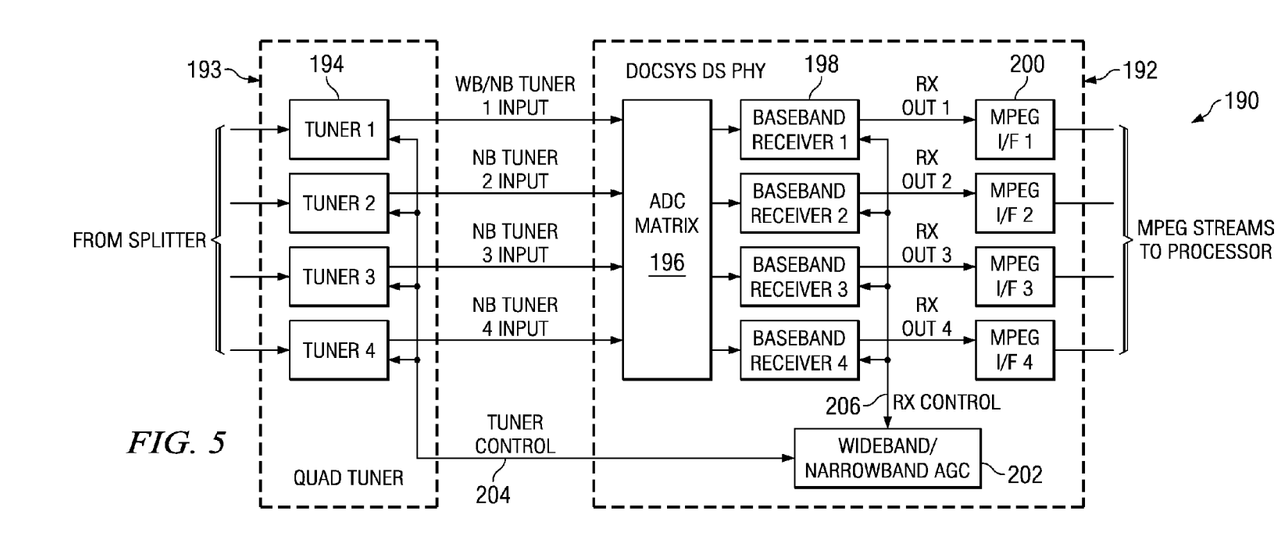
FIG. 5 is a block diagram illustrating the downstream PHY of the cable modem of the present invention in more detail.

A block diagram illustrating the downstream PHY of the cable modem of the present invention in more detail is shown in FIG. 5. The downstream path, generally referenced 190, comprises a DOCSIS DS PHY 192 coupled to a quad tuner 193. For clarity sake, only a portion of the downstream path is shown wherein, in particular, the diplexer and processor circuitry of FIGS. 2 and 4 is not shown.

The quad tuner 193 comprises four tuner sub-circuits 194, labeled tuner 1 through tuner 4. The DOCSIS DS PHY comprises an ADC matrix 196, four baseband receivers 198, labeled baseband receiver 1 through baseband receiver 4, four MPEG interface (I/F) circuits 200, labeled MPEG I/F 1 through MPEG I/F 4 and a wideband/narrowband automatic gain control (AGC) circuit 202 comprising a matrix of eight (i.e. four tuners with I and Q for signals for each).

In operation, the receive input signal from the splitter is input to the four tuners which are each tuned to a particular channel in accordance with a tuner control signal 204 directed at each individual tuner sub-circuit. The wideband/narrowband (WB/NB) tuner 1 input through wideband/narrowband (WB/NB) tuner 4 input signals are input to the ADC matrix which converts the analog input signals to a digital format. These digital signals are input to their respective baseband receivers 198 which are controlled via an RX control signal 206 from the wideband/narrowband AGC matrix 202. The baseband output signals are input to the MPEG I/F circuits 1 through 4. The resultant MPEG streams are input to the processor where they are formatted and processed further by video processor 90 (FIG. 2) before being output to the video interface 110 for viewing by users.

Figure 6:
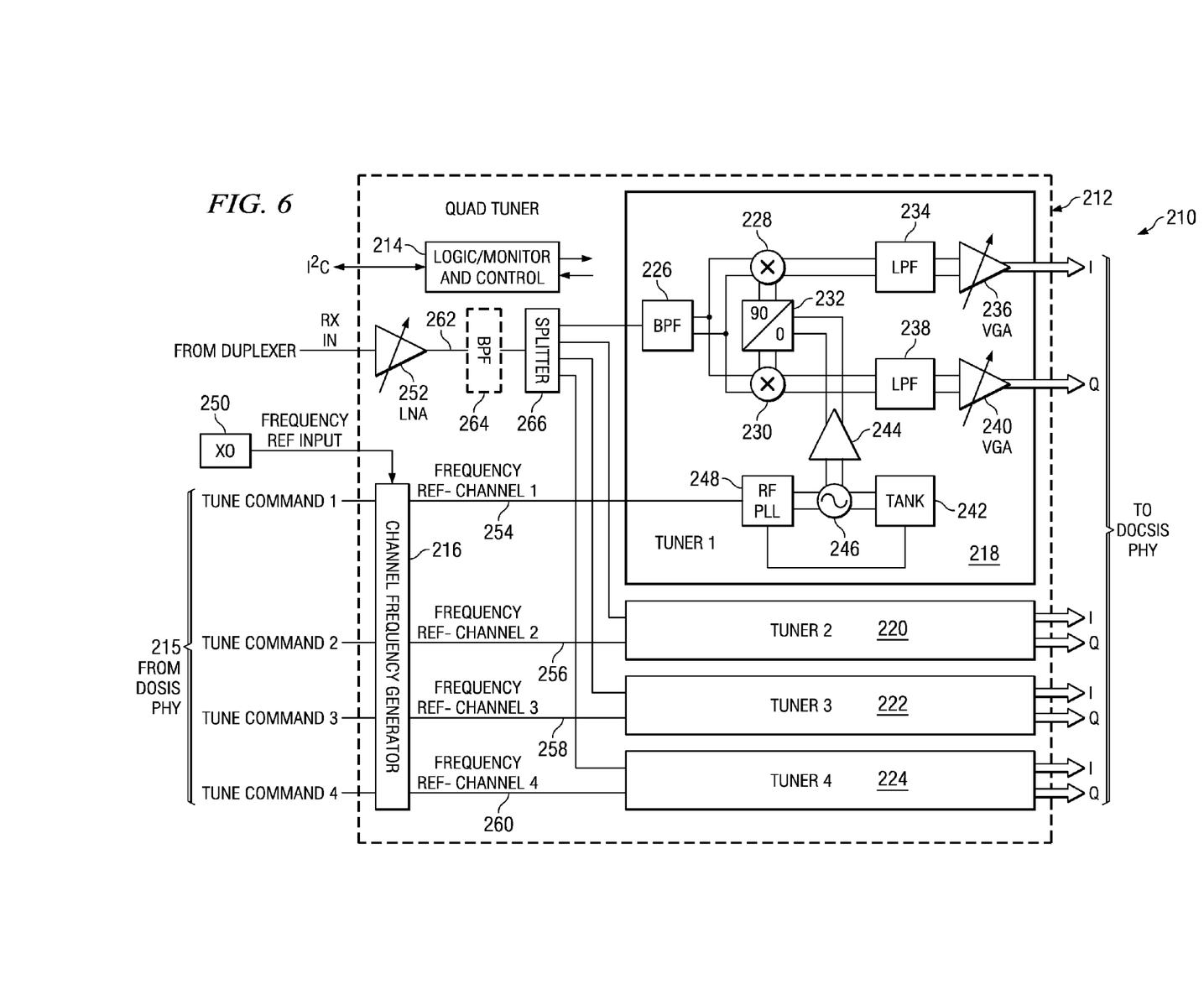
FIG. 6 is a block diagram illustrating an example embodiment of the quad tuner of the present invention in more detail.

A block diagram illustrating an example embodiment of the quad tuner of the present invention in more detail is shown in FIG. 6. The quad tuner, generally referenced 212, comprises a channel frequency generator 216, logic, monitoring and control circuit 214, low noise amplifier (LNA) 252, optional band pass filter (BPF) 264, splitter 266 and four tuner sub-circuits (also referred to simply as "tuners") 218, 220, 222, 224, labeled tuner 1 through tuner 4, respectively.

In operation, the channel frequency generator is operative to generate the four frequency reference signals for each of the tuners. A crystal oscillator 250 which may comprise a DCXO provides the basic frequency input signal to the channel frequency generator. The DCXO signal serves as the reference for the PLL blocks in each tuner and also as the clock for the internal logic module 214. In accordance with each of the tune commands signals 215 (i.e. tune command 1 through tune command 4) provided by the DCSIS PHY circuit, a corresponding frequency reference signal is generated that causes a respective tuning circuit to receive a particular channel in the CBW downstream band. In particular, frequency reference 254 is generated for a first channel is input to tuner 1, frequency reference 256 is generated for a second channel is input to tuner 2, frequency reference 258 is generated for a third channel is input to tuner 3 and frequency reference 260 is generated for a fourth channel is input to tuner 4.

The RX in signal from the duplexer is input to the adjustable LNA 252. The amplified signal 262 is then input to the splitter 266 which is operative to feed the amplified RX in signal to the four tuner circuits. Note that for clarity sake, the details of only one of the tuner sub-circuits are shown. Tuners 2, 3 and 4 comprise the same circuitry as tuner 1 and thus are not shown.

For illustration purposes only, the tuner sub-circuits shown comprise direct conversion receiver designs. It is appreciated that the invention is to not limited to this example, as other receiver configurations are possible as well without departing from the scope of the invention. The direct conversion architecture is well suited for single-chip integration. This architecture, which is also known as zero-IF or homodyne, converts the center of the desired RF signal directly to DC in the first mixers.

The direct conversion receiver of the present invention comprises an LNA, a pre-select filter and quadrature mixers, followed by channel select filters, variable-gain amplifiers, and A/D converters. In accordance thereto, each of the direct conversion receiver sub-circuits comprises a band pass filter (BPF) 226, quadrature mixer (i.e. I mixer 228 and Q mixer 230), low pass filters (LPFs) 234, 238, variable gain amplifiers (VGAs) 236, 240, RF phase locked loop (PLL) 248, oscillator (e.g., VCO) 246, LC tank 242, amplifier 244 and 90 degree phase shift 232.

In operation, the frequency reference signal from the channel frequency generator is used to configure the PLL and oscillator to a particular channel. The receive RX in signal from the splitter is applied to the I and Q mixers where they are converted to zero IF frequency. The baseband signal is low pass filtered and amplified. The output I and Q signals from all four tuners sub-circuits are then input to the DOCSIS PHY where they are converted to digital via the ADC matrix before being processed further.

In this embodiment, only a single LNA is provided which is shared among all the tuner sub-circuits. A separate channel pre-select filter (i.e. BPA 226) is provided in each tuner sub-circuit. In an alternative embodiment, a single channel pre-select filter (dashed BPF 264) is placed before the four tuner sub-circuits. In this alternative embodiment, the BPF filters 226 are not in the circuit.

Note that the image filter after the LNA is not required because the desired signal is on both side bands. This relaxes the design of the LNA mixer interface because there is no need to drive an external impedance, for example, 50Ω. The quadrature I and Q channels are necessary while receiving typical phase and frequency modulated signals, because the two sidebands of the RF spectrum comprise different information and result in irreversible corruption if they overlap each other without being separated into two phases. Channel filtering in direct conversion receivers is typically performed using low pass filters, which is implemented with on-chip active circuits. The amplification and channel filtering is distributed across the baseband chain to improve the performance of the receiver.

The logic, monitoring and control circuit 214 comprises registers responsible for the normal operation of the tuner circuits. It also controls and schedules the various modules operation modes. An outside interface, the I²C protocol for example, is provided for monitoring and control purposes. Power supply filtering and stabilization is also provided to ensure clean performance, isolated from the noisy PCB environment.

The above described modules, as well as the LNA, can be provided once for all four tuner circuits thus saving significant die area. Some of the modules (e.g., power supply filtering) may need to be expanded slightly to accommodate the new design environment. It is also noted that the performance of the multiple tuner circuit is similar to that of a single channel tuner with the benefit of a dramatic reduction in total cost.

Figure 7:
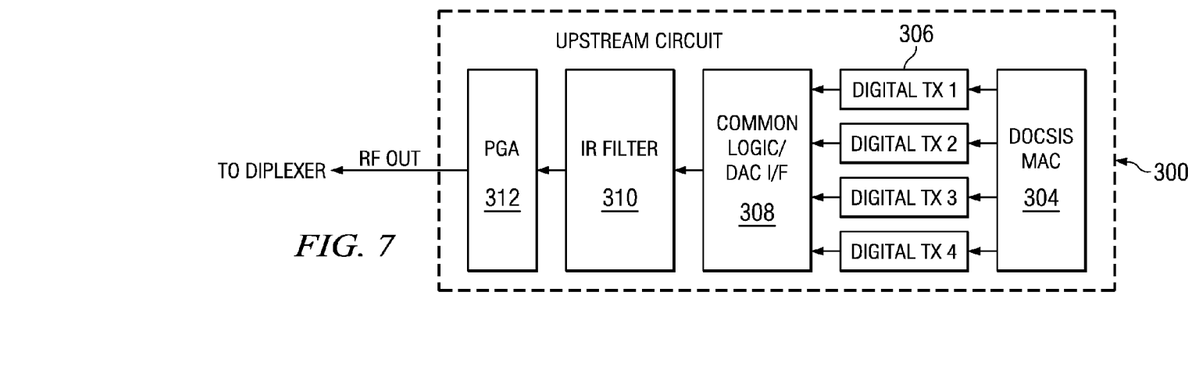
FIG. 7 is a block diagram illustrating the upstream circuit path of the cable modem of the present invention.

A block diagram illustrating the upstream circuit path of the cable modem of the present invention is shown in FIG. 7. The upstream circuit, generally referenced 300, comprises a DOCSIS MAC 304, a plurality of digital TX circuits 306 (labeled digital TX 1 through digital TX 4), common logic/DAC I/F circuit 308, image reject filter 310 and PGA 312. The RF output generated is input to the duplexer where it is coupled to the antenna during TX mode.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A single chip tuner integrated circuit for use in a cable modem, comprising:
   a frequency reference input;
   means for generating a plurality of frequency reference signals from said frequency reference input, wherein each frequency reference signal is generated based on a corresponding one of a plurality of tune command signals;
   a radio frequency (RF) receive signal input for receiving an input RF receive signal;
   an amplifier coupled to said RF receive signal input, said amplifier operative to amplify said input RF receive signal to generate an amplified RF receive signal thereby;
   a band pass filter operative to filter said amplified RF receive signal to yield a filtered RF receive signal therefrom; and
   a plurality of tuner circuits, integrated in said integrated circuit, operative to receive said filtered RF receive signal, said tuner circuits operative to generally simultaneously output one of a plurality of different frequency channels based on a corresponding one of said frequency reference signals input thereto.

2. The single chip tuner integrated circuit according to claim 1, wherein said input receive signal comprises a Data Over Cable Service Interface Specification (DOCSIS) signal.

3. The single chip tuner integrated circuit according to claim 1, wherein said plurality of tuner circuits comprises four tuner circuits.

4. The single chip tuner integrated circuit according to claim 1, wherein each said tuner circuit comprises an I mixer and a Q mixer operative to mix said filtered RF receive signal with a local oscillator signal generated in accordance with said corresponding frequency reference signal.

5. The single chip tuner integrated circuit according to claim 1, wherein each said tuner circuit comprises means for mixing said filtered RF receive signal to baseband in accordance with said corresponding frequency reference signal.

6. The single chip tuner integrated circuit according to claim 1, wherein each said tuner circuit comprises baseband channel filters for filtering an I baseband signal and a Q baseband signal.

7. The single chip tuner integrated circuit according to claim 1, wherein each said tuner circuit comprises variable gain amplifiers for amplifying a filtered I baseband signal and a filtered Q baseband signal.

8. The single chip tuner integrated circuit according to claim 1, wherein said amplifier comprises a low noise amplifier (LNA).

9. A single chip tuner integrated circuit for use in a cable modem, comprising:
   a frequency reference input;
   means for generating a plurality of frequency reference signals from said frequency reference input, wherein each frequency reference signal is generated based on a corresponding one of a plurality of tune command signals;
   a radio frequency (RF) receive signal input for receiving an input RF receive signal;
   an amplifier coupled to said RF receive signal input, said amplifier operative to amplify said input RF receive signal to generate an amplified RF receive signal thereby; and
   a plurality of tuner circuits, integrated in said integrated circuit, operative to receive said amplified RF receive signal, said tuner circuits operative to generally simultaneously output one of a plurality of different frequency channels based on a corresponding one of said frequency reference signals input thereto.

10. The single chip tuner integrated circuit according to claim 9, wherein said input receive signal comprises a Data Over Cable Service Interface Specification (DOCSIS) signal.

11. The single chip tuner integrated circuit according to claim 9, wherein said plurality of tuner circuits comprises four tuner circuits.

12. The single chip tuner integrated circuit according to claim 9, wherein each said tuner circuit comprises a band pass filter operative to generate a filtered RF receive signal from said amplified RF receive signal.

13. The single chip tuner integrated circuit according to claim 9, wherein each said tuner circuit comprises an I mixer and a Q mixer operative to mix said amplified RF receive signal with a local oscillator signal generated in accordance with said corresponding frequency reference signal.

14. The single chip tuner integrated circuit according to claim 9, wherein each said tuner circuit comprises means for mixing said amplified RF receive signal to baseband in accordance with said corresponding frequency reference signal.

15. The single chip tuner integrated circuit according to claim 9, wherein each said tuner circuit comprises baseband channel filters for filtering an I baseband signal and a Q baseband signal.

16. The single chip tuner integrated circuit according to claim 9, wherein each said tuner circuit comprises variable gain amplifiers for amplifying a filtered I baseband signal and a filtered Q baseband signal.

17. The single chip tuner integrated circuit according to claim 9, wherein said amplifier comprises a low noise amplifier (LNA).

18. A single chip tuner integrated circuit for use in a Data Over Cable Service Interface Specification (DOCSIS) compatible cable modem, comprising:
a frequency reference input;
means for generating four frequency reference signals from said frequency reference input, wherein each frequency reference signal is generated based on a corresponding one of four tune command signals;
a radio frequency (RF) receive signal input operative to receive a DOCSIS RF input signal; and
an amplifier coupled to said RF receive signal input, said amplifier operative to amplify said DCSIS RF input signal to generate an amplified RF receive signal thereby; and
a tuner circuit comprising four tuner sub-circuits, integrated in said integrated circuit, said tuner sub-circuits operative to receive said amplified RF receive signal and to generally simultaneously output one of a plurality of different frequency channels based on a corresponding one of said frequency reference signals input thereto.

19. The single chip tuner integrated circuit according to claim 18, wherein each said tuner sub-circuit comprises a band pass filter operative to generate a filtered RF input signal from said amplified RF receive signal.

20. The single chip tuner integrated circuit according to claim 18, wherein each said tuner sub-circuit comprises an I mixer and a Q mixer operative to mix said amplified RF receive signal with a local oscillator signal generated in accordance with said corresponding frequency reference signal.

21. The single chip tuner integrated circuit according to claim 18, wherein each said tuner sub-circuit comprises means for mixing said amplified RF receive signal to baseband in accordance with said corresponding frequency reference signal.

22. The single chip tuner integrated circuit according to claim 18, wherein each said tuner sub-circuit comprises baseband channel filters for filtering an I baseband signal and a Q baseband signal.

23. The single chip tuner integrated circuit according to claim 18, wherein each said tuner sub-circuit comprises variable gain amplifiers for amplifying a filtered I baseband signal and a filtered Q baseband signal.

24. The single chip tuner integrated circuit according to claim 18, wherein said amplifier comprises a low noise amplifier (LNA).

25. A cable modem, comprising:
a memory;
one or more interface ports;
a single chip tuner integrated circuit comprising:
a frequency reference input;
means for generating a plurality of frequency reference signals from said frequency reference input, wherein each frequency reference signal is generated based on a corresponding one of four tune command signals;
a CATV radio frequency (RF) receive signal input for receiving an RF receive signal;
a plurality of tuner circuits, integrated in said integrated circuit, operative to receive said RF receive signal, said tuner circuits operative to generally simultaneously output one of a plurality of different frequency channels based on a corresponding one of said frequency reference signals input thereto;
a PHY circuit coupled to said tuner circuits and operative to generate a plurality of raw video streams in accordance with the plurality of different frequency channels output from said tuner circuits; and
a processor coupled to said memory, said one or more interface ports, said tuner circuits and said PHY circuit, said processor operative to implement a media access control (MAC) layer operative to generate one or more output video streams from said plurality of raw video streams input thereto.

26. The cable modem according to claim 25, wherein said plurality of channels comprises Data Over Cable Service Interface Specification (DOCSIS) channels.

27. The cable modem according to claim 25, wherein each said tuner circuit comprises a band pass filter operative to generate a filtered RF receive signal from said RF receive signal.

28. The cable modem according to claim 25, wherein each said tuner circuit comprises an I mixer and a Q mixer operative to mix said RF receive signal with a local oscillator signal generated in accordance with said corresponding frequency reference signal.

29. The cable modem according to claim 25, wherein each said tuner circuit comprises means for mixing said RF receive signal to baseband in accordance with said corresponding frequency reference signal.

30. The cable modem according to claim 25, wherein each said tuner circuit comprises baseband channel filters for filtering an I baseband signal and a Q baseband signal.

31. The cable modem according to claim 25, wherein each said tuner circuit comprises variable gain amplifiers for amplifying a filtered I baseband signal and a filtered Q baseband signal.

32. The cable modem according to claim 25, further comprising a low noise amplifier (LNA) coupled to said RF receive signal input, said LNA operative to amplify said RF receive signal to generate an amplified RF receive signal thereby.

* * * * *